US008884910B2

(12) United States Patent
Dietz (10) Patent No.: US 8,884,910 B2
(45) Date of Patent: Nov. 11, 2014

(54) RESISTIVE MATRIX WITH OPTIMIZED INPUT SCANNING

(75) Inventor: Paul Dietz, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 981 days.

(21) Appl. No.: 12/871,817

(22) Filed: Aug. 30, 2010

(65) Prior Publication Data

US 2012/0050208 A1    Mar. 1, 2012

(51) Int. Cl.
*G06F 3/041*    (2006.01)
*G06F 3/045*    (2006.01)

(52) U.S. Cl.
CPC .............. *G06F 3/045* (2013.01); *G06F 3/0416* (2013.01)
USPC .......................................... 345/174; 345/173

(58) Field of Classification Search
USPC .................. 345/204–215, 690–699, 173–179
See application file for complete search history.

(56) References Cited

U.S. PATENT DOCUMENTS

| | | | |
|---|---|---|---|
| 3,792,466 | A | 2/1974 | Arnold et al. |
| 4,517,553 | A | 5/1985 | Engstrom |
| 5,457,455 | A | 10/1995 | Lee |
| 6,784,810 | B2 | 8/2004 | Falik et al. |
| 7,612,690 | B2 | 11/2009 | Wright et al. |
| 8,325,147 | B2* | 12/2012 | Brand et al. ................. 345/173 |
| 2002/0070923 | A1 | 6/2002 | Levy et al. |
| 2003/0085882 | A1 | 5/2003 | Lu |
| 2006/0082473 | A1 | 4/2006 | Kim |
| 2008/0296073 | A1 | 12/2008 | McDermid |
| 2008/0309631 | A1* | 12/2008 | Westerman et al. .......... 345/173 |
| 2009/0052376 | A1 | 2/2009 | Cave et al. |
| 2010/0066572 | A1 | 3/2010 | Dietz et al. |
| 2010/0097343 | A1 | 4/2010 | Fang |
| 2010/0141604 | A1* | 6/2010 | Cai et al. ...................... 345/174 |
| 2011/0025619 | A1* | 2/2011 | Joguet et al. .................. 345/173 |
| 2013/0215049 | A1* | 8/2013 | Lee .............................. 345/173 |

FOREIGN PATENT DOCUMENTS

| | | |
|---|---|---|
| CN | 1582453 A | 2/2005 |
| EP | 2111572 A2 | 10/2009 |
| FR | 0760021 A2 * | 12/2007 |

(Continued)

OTHER PUBLICATIONS

Pascal Joguet, Foreign Application 0760021, Dec. 19, 2007.*

(Continued)

*Primary Examiner* — Kent Chang
*Assistant Examiner* — Nelson Rosario
(74) *Attorney, Agent, or Firm* — Jeremy Snodgrass; Sergey Lamansky; Micky Minhas (57) ABSTRACT

A resistive matrix with optimized input scanning is provided by a method of discerning input location(s) on a resistive column-row matrix which includes receiving physically-applied input(s) at the resistive column-row matrix and, during application of the one or more physically-applied inputs, performing a hierarchical scan of the resistive column-row matrix to determine whether the physically-applied input(s) are causing activation of a column-row cell within a multi-cell group of the resistive column-row matrix. The method further includes performing a supplemental scan within a multi-cell group if it is determined that a physically-applied input is causing activation of a column-row cell within the multi-cell group, and generating, based on the hierarchical and supplemental scans, an output indicative of the input location(s) on the resistive column-row matrix of the one or more physically-applied inputs.

18 Claims, 2 Drawing Sheets

(56) References Cited

FOREIGN PATENT DOCUMENTS

| JP | 2003241888 A | 8/2003 |
|----|--------------|--------|
| WO | 2008/085719 A2 | 7/2008 |
| WO | 2009112649 A1 | 9/2009 |

OTHER PUBLICATIONS

"Designing a USB Keyboard with the Cypress Semiconductor CY7C63413 USB Microcontroller" retrieved at <<http://nagasm.suac.net/ASL/usb/usbkbd.pdf>>, Cypress Semiconductor Corporation, Oct. 27, 1997, pp. 13.

"MF2 Compatible Keyboard with COP8 Microcontrollers", retrieved at << http://www.national.com/an/AN/AN-734.pdf>>, Feb. 1991, pp. 20.

"International Search Report", Mailed Date: Feb. 29, 2012, Application No. PCT/US2011/047124, Filed Date: Aug. 9, 2011, pp. 10.

State Intellectual Property Office of China, Second Office Action Issued in Chinese Patent Application No. 201110252328.9, Apr. 21, 2014, 6 Pages.

State Intellectual Property Office of China, Office Action and Search Report Issued in Chinese Patent Application No. 201110252328.9, Oct. 25, 2013, 9 Pages.

ISA European Patent Office, Extended Search Report Issued in European Patent Application No. 11822317.1, Aug. 1, 2014, 10 Pages.

* cited by examiner

RESISTIVE MATRIX WITH OPTIMIZED INPUT SCANNING

BACKGROUND

Various types of electronic devices utilize input devices to receive input from a user. Some input devices may have keys configured to be manually depressed by a user, whereas other input devices may include a touch-sensitive surface capable of detecting a user's touch inputs. It may be challenging for input devices to correctly handle multiple simultaneous or overlapping inputs. Further, it may be challenging to optimize scanning of the input device in such a way so as to increase accuracy of input-detecting scans without comprising the scan rate.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to one aspect of this disclosure, in a resistive column-row matrix configured to provide output in response to touch or other physically-applied inputs, a method of discerning one or more input locations on the resistive column-row matrix is provided. The method includes receiving one or more physically-applied inputs at the resistive column-row matrix. The method further includes, during application of the one or more physically-applied inputs, performing a hierarchical scan of the resistive column-row matrix to determine, for each of a plurality of multi-cell groups comprising the resistive column-row matrix, whether the one or more physically-applied inputs are causing activation of a column-row cell within the multi-cell group. The method further includes performing a supplemental scan within a multi-cell group if it is determined that a physically-applied input is causing activation of a column-row cell within the multi-cell group. The method further includes generating, based on the hierarchical scan and the supplemental scan, an output indicative of the one or more input locations on the resistive column-row matrix of the one or more physically-applied inputs.

DETAILED DESCRIPTION

Input devices may utilize various technologies for receiving user input. Some input devices (e.g., keyboards) have physical keys that can be mechanically actuated by the user. Another common approach is to use visually-presented keys on a touch-sensitive display, with the keys being actuated by touch inputs (e.g., finger touch, touch gesture, multi-touch input, etc.) that are detected via changed electrical properties resulting from applied touch. In some cases, the key and touch approaches employ resistive actuation, in which the force applied to a particular location on the device (e.g., through mechanical key actuation or a touch input) creates a change in resistance which produces a signal, for example by changing the current through or voltage of an associated circuit. The resistance variation is achieved through physical contact, and may be further varied in response to the pressure or force of the applied contact. In some embodiments, the resting, or unactuated state is an open circuit, while the actuated state connects a row to a column via a resistance of easily measured value. It will be appreciated, however, that any appropriate electrical states/properties (e.g., other than open circuit) may correspond to different aspects/states of key/touch operation.

Such input devices may utilize a resistive matrix for detecting physically-applied inputs and generating the resultant outputs. As described in greater detail below, the resistive matrix includes sensing circuitry for detecting physically-applied inputs and determining locations of the inputs. Detection of input locations typically is achieved through a scanning process by which electrical circuitry reads current, resistance, voltage and/or other parameters associated with specific locations on the resistive matrix. Furthermore, a "cell" or "location" may broadly refer to something other than a specific column-row intersection. In some cases, for example, a location between intersections or proximal to a particular intersection may be inferred, such as through interpolation or other methods. In many examples, however, the scanned locations are specific cells on the resistive matrix, with each cell being defined as a location corresponding to an intersection of a specific column and row on the resistive matrix. In addition to components and processing capabilities, the configuration of the sensing circuitry, as well as the scanning approach, may dictate the accuracy and time duration of a given scan. It is often desirable to perform scans in such a way so as to optimize both accuracy and the scan rate. In this way, the user is provided with a responsive and accurate input device, and the input device itself may spend more time in a low-power mode upon completing scans.

Figure 1:
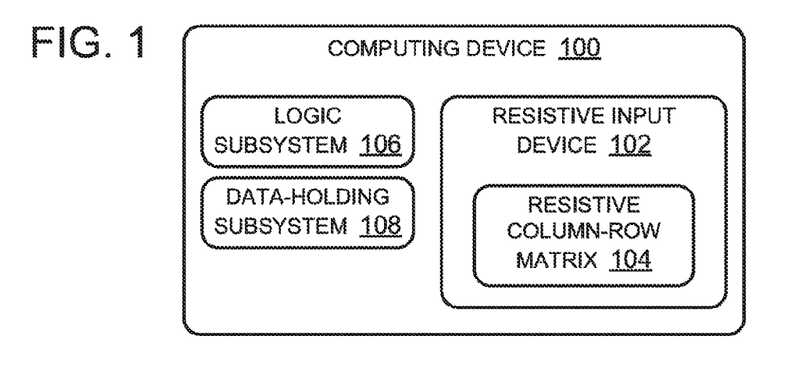
FIG. 1 shows a block diagram of an example computing device that may be used in connection with the resistive matrix scanning described herein.

Turning now to FIG. 1, FIG. 1 shows an example computing device 100 comprising a resistive input device 102 configured to receive touch or other physically-applied inputs. As a nonlimiting example, resistive input device 102 may be a keyboard having mechanical keys and/or visually-presented keys that are actuatable by physically-applied inputs. Accordingly, resistive input device 102 further includes a resistive column-row matrix 104 configured to provide output in response to touch or other physically-applied inputs.

Resistive input device 102 may be configured to accurately determine any combination of key actuations and/or multi-touch combinations on a resistive touch device. This is sometimes referred to as "n-key rollover" or "anti-ghosting." Such techniques allow for resistive input device 102 to independently report the force associated with each key actuation. Resistive input device 102 may be configured to read resistive column-row matrix 104 to determine key actuations in any suitable manner. For example, resistive column-row matrix 104 may include circuitry organized into columns and rows with intersections thereof corresponding to locations that may be electrically activated by physically-applied inputs. In such a case, the columns of resistive column-row matrix 104 may be driven to known scan control signals (e.g., voltages), while the current exiting a row of resistive column-row matrix 104 is supplied to a low impedance connection and measured. As used herein, the term matrix connotes an arrangement of selective electrical connections. In many cases, the electrical leads of the matrix may indeed be arranged in horizontal and vertical orientations although other arrangements may be employed while still falling within the term matrix.

When the columns of resistive column-row matrix 104 are driven to known scan control signals, the measurements can be done in parallel, presuming appropriate circuitry on each column. Alternatively, a single circuit can be multiplexed across the columns, measuring each in turn, as described in more detail below with reference to FIG. 3. In either case, traditional approaches for scanning a resistive column-row matrix include setting a single column for measurement, measuring the rows, and then repeating this process for each column. In this way, the resistive input device "scans" the matrix to determine activated cells within the column-row combinations being measured which correspond to key actuations.

It is highly desirable for such scans to be performed as quickly as possible. However, the repetition of the above-described traditional approach may result in scanning and/or re-scanning inactive regions of the matrix, resulting in longer scan times. As an example, an input device may have over 100 keys corresponding to 20 columns of the column-row matrix. Depending on the type of circuitry, scanning may include repeating the measurement for each column (e.g., in the case of parallel row circuitry) or repeating the measurement for each key (e.g., in the case of multiplexed column circuitry). Longer scan times resulting from repetitive scanning may contribute to limiting the responsiveness of the input device. This is particularly true in the case of a pressure-sensitive input device, where the column circuitry is typically a multiplexed analog-to-digital (AD) converter that requires a significant amount of time to complete a single measurement. As such, resistive column-row matrix 104 is configured to strategically scan for key activations so as to minimize the duration of the scan, as described in more detail below.

It will be appreciated from the above that rapid and efficient scanning can be important in terms of human perception. In particular, it is desirable for the scans to occur at a rate that is significantly faster than the rate at which key actuations or other physical inputs vary. However, human perception is not the only factor driving a desire for a rapid scan. For the case of resistive input device 102 being wireless and/or battery powered, power may be a limited resource. As such, the quicker a scan can be completed, the more time the system can spend in a low-power mode (e.g., a sleep mode). For example, resistive input device 102 may be configured to sleep during a default mode, and wake upon a key actuation, at which time resistive input device 102 may then perform a scan to determine which keys/locations are currently being actuated. Resistive input device 102 may then subsequently return to sleep mode when no activity is detected.

Thus, resistive input device 102 is configured to strategically scan for key actuations by performing a two-part scan so as to minimize the duration of the scan. The scan approach may be thought of as hierarchical, in the sense that a regional or multi-cell scan is performed first to determine an approximate location of an input, with a secondary supplemental scan being performed to pinpoint the location if the preliminary scan indicates activation within a tested region. More specifically, a hierarchical scan may be performed first to locate potentially activated region(s) of resistive column-row matrix 104, followed by a supplemental scan to determine specific location(s) of key actuations within the activated region(s) of resistive column-row matrix 104. As such, the hierarchical scan can quickly eliminate inactive regions of the matrix, allowing the supplemental scan to quickly target the activated region(s) of interest.

Figure 2:
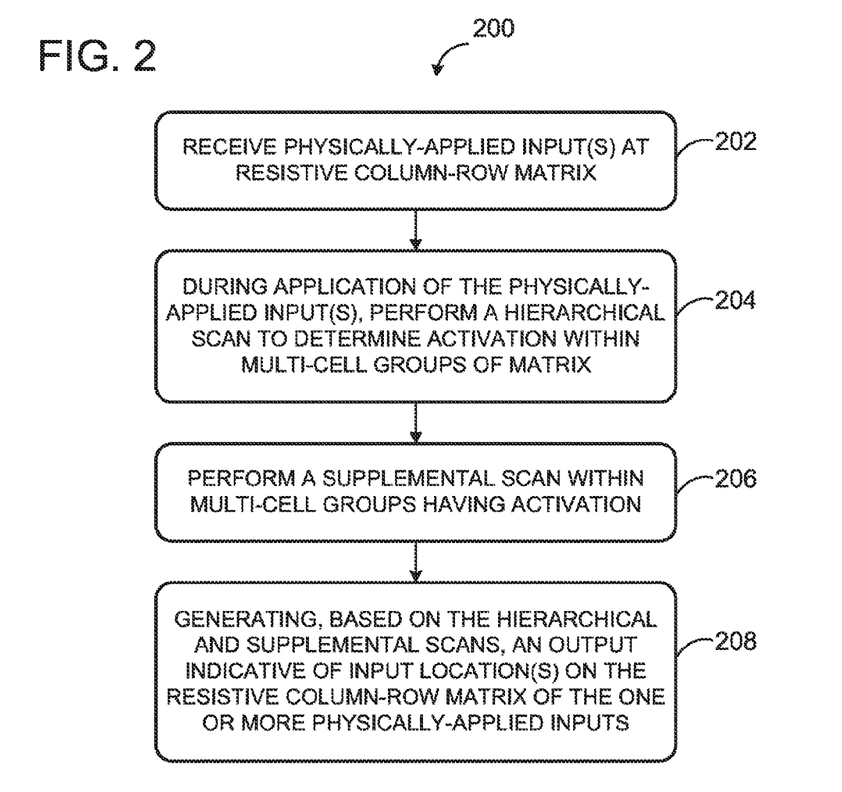
FIG. 2 shows a flow diagram of an example scanning method for discerning one or more input locations on a resistive column-row matrix.

FIG. 2 illustrates such a method of discerning one or more input locations on the resistive column-row matrix. Method 200 may be performed, for example, within resistive column-row matrix 104 of resistive input device 102 illustrated in FIG. 1. At 202, method 200 includes receiving one or more physically-applied inputs at the resistive column-row matrix. Such physically-applied inputs may be applied, for example, by a user's touch or any other suitable device, such as a stylus. As in the previously-discussed examples, inputs can also include activation of selected keys on a keyboard-switched matrix.

At 204, method 200 includes, during application of the one or more physically-applied inputs, performing a hierarchical scan of the resistive column-row matrix. The hierarchical scan determines, for each of a plurality of multi-cell groups comprising the resistive column-row matrix, whether the one or more physically-applied inputs are causing activation of one or more column-row cells within the multi-cell group. In other words, the hierarchical scan broadly determines which region(s) of the matrix include column-row cell(s) activated by physically-applied inputs.

The multi-cell groups may be defined in any suitable manner. For example, in the case of a resistive column-row matrix comprising rows and columns, each intersection of a particular row and column may define a cell. Thus, a multi-cell group may include any suitable grouping of one or more cells. As a nonlimiting example, each multi-cell group may be a row of the resistive column-row matrix. In such a case, performing the hierarchical scan may include scanning each row to determine if that row includes any activated cells. However, it should be appreciated that this example is nonlimiting, and each multi-cell group may instead be associated with another region of the column-row matrix. Further, in some embodiments, one or more of the multi-cell groups may be determined based on input locations discerned within a previous scan, so that knowledge from a previous scan may be strategically utilized in a subsequent scan. To illustrate this example, the reader should understand that matrix scans may be thought of as occurring in a series of frames, where scanning of a frame means that the entire matrix has been scanned. Thus, the scanning may be conceived of in terms of a frame rate, where the frame rate is the rate or frequency at which the scanning method enables a complete scan of the matrix. In some embodiments, multi-cell groups may be defined based on previous hierarchical and/or supplemental scans. Additionally or alternatively to defining multi-cell groups, a previous hierarchical and/or supplemental scan may dictate an order in which subsequent scan operations are performed.

Further yet, multi-cell groups may be dynamically defined during the course of multiple sequential frame scans. For example, during a first frame scan employing rows of the matrix as the multi-cell groups, an input might be defined as having occurred within a particular region of the matrix. This region may then be defined as a discrete multi-cell group for purposes of a subsequent scan, even though the newly-defined multi-cell group might be something other than a row or rows of the matrix.

Continuing with method 200, at 206, method 200 includes performing a supplemental scan within a multi-cell group if it is determined that a physically-applied input is causing activation of a column-row cell within such multi-cell group. It will be appreciated that the example method and other discussion herein do not imply that scanning must occur in a particular sequence or order. For example, hierarchical scans covering the entire matrix may be performed prior to any supplemental scan. Alternatively, a supplemental scan of a region can be performed immediately after a hierarchical scan indicates activity within the region. Therefore, since the hierarchical scan has already determined the region(s) of interest, the supplemental scan can focus on just the region(s) of interest so as to minimize the scan time.

For embodiments of method 200 wherein some (e.g., some but not all) of the multi-cell groups are based on one or more previously-discerned input locations on the resistive column-row matrix, the above-described hierarchical and supplemental scans can determine whether the input locations differ with respect to those of a previous scan. For example, in the case that a scan rate is significantly faster (e.g., hundreds to thousands of times per second) than a rate of user input, it may be common for the activated regions of the matrix to not change (e.g., no new keys/locations have been activated since a last scan). Thus, the hierarchical scan may be utilized to test whether any cells in previously inactive regions have been activated. If not, then the supplemental scan can scan the same regions as scanned in the previous scan.

Accordingly, the multi-cell groups for the hierarchical scan may be selected so as to exclude other multi-cell groups comprising the one or more previously-discerned input locations on the resistive column-row matrix. This allows the hierarchical scan to be performed over the region(s) of the matrix which do not include inputs identified in the last scan. The hierarchical scan may then quickly ascertain if any additional keys/locations have been actuated/activated since the previous scan.

In such a case, upon performing the hierarchical scan based on a previous scan, method 200 may further include determining that a physically-applied input is not causing activation of a column-row cell within the multi-cell groups, and thus these multi-cell groups are still inactive just as they were in the previous scan. As such, the supplemental scan may then be performed over the active regions, namely, the other multi-cell groups comprising one or more previously-discerned input locations on the resistive column-row matrix.

It should be appreciated that such selection of multi-cell groups is nonlimiting, and multi-cell groups may be defined in any suitable way. For example, to generalize the above-described approach, method 200 may further include determining one or more sets of multi-cell groups from the plurality of multi-cell groups over which to perform the hierarchical and supplemental scans. Thus, as nonlimiting examples, these sets may be selected based on previous scan(s), previously-discerned input locations, predetermined information, previously-selected multi-cell groups, etc. As a general example, method 200 may include selecting a first set of multi-cell groups, and performing the hierarchical scan over the first set of multi-cell groups. By scanning the first set of multi-cell groups, it can be quickly determined whether a supplemental scan is needed for the first set, or whether the supplemental scan should instead be applied to a second set of multi-cell groups. Accordingly, if it is determined that there are activated regions within the first set of multi-cell groups, then the supplemental scan may be performed over the first set of multi-cell groups. However, if it is determined that there are no activated regions within the first set of multi-cell groups, then the supplemental scan may be performed over the second set of multi-cell groups.

Continuing with method 200, upon performing the hierarchical and supplemental scans over the multi-cell groups selected in any suitable manner as described above, at 208 method 200 includes generating, based on the hierarchical scan and the supplemental scan, an output indicative of the one or more input locations on the resistive column-row matrix of the one or more physically-applied inputs. As an example, the input location may be at a column-row cell (e.g., an intersection of a column and a row) and thus may be indicated by that column and row. As another example, the input location may be proximal to a column-row cell (e.g., near an intersection of a column and a row) and thus may be indicated by a distance from the intersection of that row and column. Thus, it should be appreciated that interpolation may be used in conjunction with a scan or scans to infer the specific location of an input. This inferential approach may be particularly useful in the case of touch devices, which introduce the possibility of a user input activating adjacent locations in the matrix.

When performing a hierarchical and/or supplemental scan (e.g., at 204 and/or 206), method 200 may determine whether the one or more physically-applied inputs are causing activation of a column-row cell within a given multi-cell group in any suitable manner. As briefly introduced above, a resistive column-row matrix such as resistive column-row matrix 104 of FIG. 1 may include sensing circuitry that may be selectively activated to determine whether or not inputs are present. As a nonlimiting example, the input device may include a force-sensitive resistive material which changes its resistance in response to applied force(s) and/or pressure(s). By electrically connecting the force-sensitive resistive material to the sensing circuitry, activation within a multi-cell group may be determined based on the change in the resistance at the site of activation. For example, force-sensitive resistive materials are typically highly resistive, such that applied force and/or pressure lowers the resistance at the location of the applied input. In such a case, activation within a multi-cell group may be determined by applying a voltage to a portion of the resistive column-row matrix (e.g., a column) and measuring a current across a corresponding portion of the resistive column-row matrix (e.g., a row). The current is then proportional to the resistance at the site of activation, as described in more detail hereafter with reference to FIG. 3.

Figure 3:
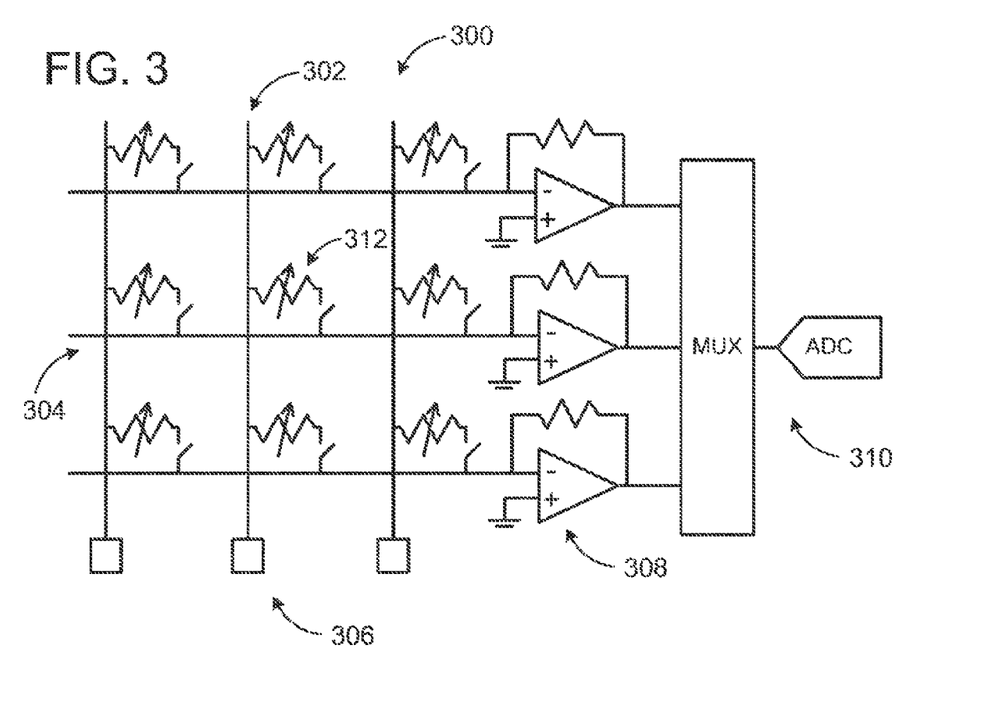
FIG. 3 schematically shows an example circuit of a resistive column-row matrix that may be scanned using the scanning approach described herein.

FIG. 3 schematically shows an example circuit 300 of a resistive column-row matrix 104 comprising a plurality of columns 302 and a plurality of rows 304. It should be appreciated that this is just one of many potentially suitable configurations of sensing circuitry and should not be considered limiting in any sense. For example, a single transimpedance amplifier 308 can be multiplexed to the row that is currently being measured. Example circuit 300 further includes output pins 306 configured to either apply a scan control signal to the corresponding column or to hold the corresponding column at a baseline signal (e.g., at ground). Example circuit 300 further includes transimpedance amplifiers 308 each configured to hold a corresponding row at a baseline signal (e.g., virtual ground). As illustrated, each row feeds into a transimpedance amplifier, followed by a single, multiplexed (MUX) analog-to-digital converter (ADC) 310. Column-row cells within column-row matrix 104 are illustrated as resistive switches 312, wherein each switch is electrically closed by an applied force (e.g., via key actuation) and wherein the magnitude of the resistance associated with each resistive switch is determined by the magnitude of the applied force. In other words, when no inputs are being physically applied to the force-sensitive resistive material, the material has a high resistance and all of the switches are open. In such a case, if columns 302 are held at a baseline signal and rows 304 are held at a baseline signal, then analog-to-digital converter 310 outputs a baseline voltage corresponding to all column-row cells of the resistive column-row matrix 104 being in an inactive state.

However, when an input is physically applied to the force-sensitive resistive material, the resistive switch at a nearby column-row cell is closed, thus completing the circuit. If the column corresponding to the column-row cell is being held at a scan control signal, current can flow across the resistive switch to the transimpedance amplifier associated with that row. Since the transimpedance amplifier is holding the row at a baseline signal, receipt of such current results in the transimpedance amplifier measuring the resulting row current by delivering a scan voltage to analog-to-digital converter 310 which is proportional to the change in resistance at the resistive switch.

As such, analysis of the scan voltage indicates whether any resistive switches are activated within circuit 300. For example, a scan voltage corresponding to an activated voltage may indicate an activated resistive switch whereas a scan voltage corresponding to a disabled voltage may indicate an inactive resistive switch. Such activated and disabled voltages may be defined in any suitable manner. For example, the activated and disabled voltages may be defined with respect to the baseline signal. For example, a disabled voltage may fall within a predetermined range of voltages about the baseline, whereas an activated voltage may fall outside of the predetermined range of voltages.

Traditionally, the resistance value of each resistive switch may be individually measured by applying a scan control signal to a single column of the resistive column-row matrix and measuring the corresponding row current set by the resistive switch. However, scanning a resistive column-row matrix having, for example, m columns and n rows in such a traditional approach requires m×n separate analog-to-digital (AD) conversions. For a typical computer keyboard, this may be somewhat over 100 individual measurements for each scan. If each measurement takes 20 µs, the time for a complete scan would be over 2 ms. Given typical AD conversion speeds on embedded controllers, it becomes clear that real-time response can be challenging, and that the processor must be running most of the time, making it difficult to achieve low power consumption.

Thus, rather than examining each key individually, resistive input device 102 is configured to examine an entire row of resistive column-row matrix 104 at a time. This is done by applying a nonzero voltage to all of the columns 302 simultaneously. The current in each row 304 is then equal to the sum of the currents through all of the resistive switches connected to that row. Assuming that the resistance drops dramatically when a key is actuated, any current above a low threshold may indicate that one or more keys on that row are currently actuated. The hierarchical scan of resistive column-row matrix 104 then examines an entire row in one AD conversion to see if any keys are actuated. If none are actuated, the hierarchical scan proceeds to the next row of resistive column-row matrix 104. If keys are actuated, the supplemental scan of resistive column-row matrix 104 will then determine which specific keys on that row are pressed. In a typical case, no keys are actuated (e.g., since the scan rate exceeds the rate of physically-applied inputs), and a hierarchical scan of resistive column-row matrix 104 can be completed with one AD conversion per row, for a total of n AD conversions. Such a scan is therefore m times faster (e.g., 20 times faster) than scanning all of the keys individually as in the case of traditional scanning approaches.

In other words, by reducing the amount of AD conversions taking place within a scan, the amount of work done in a typical scan by resistive input device 102 may be dramatically reduced in comparison to traditional scanning approaches. These energy savings may be used for various other purposes, such as making resistive input device 102 more responsive, lower power, and/or less expensive through the use of lower-performance components (e.g. a slower analog-to-digital converter 310). This may be particularly applicable to pressure-sensitive keyboards, and may influence making an affordable, high-performance system.

As another example, another typical use scenario for resistive input device 102 involves single key actuation (e.g., a key press or its touch-sensitive analog of a single-location touch). In such a case, the hierarchical scan examines each row of resistive column-row matrix 104 to determine which of the rows 304 includes the actuated key. Then, the supplemental scan of resistive column-row matrix 104 examines each key of that row to determine which key is actuated. Thus, for the case of a single key actuation, a hierarchical scan performed in such a manner includes n AD conversions and the supplemental scan includes m AD conversions, for a total of n+m AD conversions, which is significantly fewer than n×m AD conversions of a traditional scan approach which scans every key individually.

For the use scenario wherein multiple keys are actuated, the hierarchical and supplemental scan approach of the resistive column-row matrix may still be utilized. For example, if two keys in the same row are pressed, a complete scan still performs only n+m conversions. However, if they are in separate rows, then n+2m conversions are performed. In other words, the two rows are completely examined, in addition to looking at the rows in aggregate. In general, such an approach may include n+(r×m) conversions, where r is the total number of rows in which at least one key is actuated. In the worst case, when at least one key is pressed in every row of rows 304, the number of conversions performed is n+(n×m), which is less beneficial than just simply scanning each key individually. It should be understood, however, that such an extreme case may be highly unusual, and due to its infrequency, it is unlikely to diminish the dramatic improvements available through use of the herein-described hierarchical/supplemental approach.

With regard to an embodiment of method 200, the above-described scanning of circuit 300 can be implemented by performing the hierarchical scan applying a scan control signal substantially concurrently to each of the plurality of columns 302 of resistive column-row matrix 104 while holding each of the plurality of rows 304 at a baseline signal, and reading, for each row, a scan voltage corresponding to that row. For each row of rows 304, the scan voltage of the row is the voltage output by the transimpedance amplifier 308 of that row. As described above, if no resistive switches 312 are actuated by physically-applied inputs, the circuit remains open and the transimpedance amplifier of that row, in maintaining the row at a baseline signal, outputs a scan voltage corresponding to a disabled voltage. However, if one or more of resistive switches 312 are actuated by physically-applied inputs, the circuit is then closed, and the transimpedance amplifier of that row, in maintaining the row at a baseline signal, outputs a scan voltage corresponding to an activated voltage.

As such, the supplemental scan can then be performed over the selected rows which have activated cells, in order to determine which resistive switch(es) are activated within the row. Thus, performing the supplemental scan may include, for each of the plurality of rows 304 determined to include an activated column-row cell, holding the row at a baseline signal while applying a scan voltage to each of the plurality of columns 302 and reading a scan voltage for each column-row cell within the row. Since, for each row, the supplemental scan applies a scan signal to just one column at a time rather than all of the columns simultaneously, the scan voltage output by the transimpedance amplifier of that row corresponds specifically to the column-row cell of that column. As such, it can be determined, for each scan voltage, that the one or more physically-applied inputs are causing activation of the column-row cell if the scan voltage corresponds to an activated voltage. Once the activated column-row cells are identified, generating the output comprises, for each column-row cell having an activated voltage, indicating a location of the column-row cell on the resistive column-row matrix based on the column and the row of the resistive column-row matrix including the column-row cell.

Continuing with FIG. 3, as introduced above, previous scans can be advantageously utilized since the number of keys which have changed state between consecutive scans is typically very small, even when many keys are simultaneously depressed (or multiple locations are activated on a touch device). Thus, rather than performing the hierarchical scan over the entire rows 304, the hierarchical scan may be performed only across regions of the matrix associated with keys which were not pressed during the previous scan. This partial-row testing can be accomplished by applying scan control signals to only selected columns of columns 302 in which no keys were actuated in the previous scan. This has the effect of testing if any new keys have been actuated. If no new keys are actuated, the supplemental scan will then examine only the remaining columns, namely the columns in which keys were actuated in a previous scan. This can be determined in m+p AD conversions, where p is the number of keys actuated in the previous scan. Given a rapid scan rate, no keys changing state is a rather typical case, and partial-row testing within a hierarchical/supplemental scan approach allows for a significant reduction in scan time which again permits the system to remain in lower-power states longer.

Thus, in such a case of partial-row testing as described above with respect to circuit 300, the multi-cell groups of method 200 may be selected so as to scan subsets of the rows, wherein each subset includes multiple keys. For example, the multi-cell groups could be selected so as to split the group of possible keys in half, and a hierarchical scan over a first set of multi-cell groups could determine if the first set contains a newly-depressed key. The supplemental scan could then examine a second set of multi-cell groups to determine if the second set contains a newly-depressed key. Additional supplemental scans may then be performed within a smaller set of multi-cell groups. It should be appreciated that such an approach may diminish scan time albeit at the cost of significantly more complex scanning logic. As another example, statistical models of where the depressed keys are most likely to be found may be created, and optimal search patterns may be designed to find them. However, the incremental benefit may not be justified by the additional complexity.

Furthermore, the force-sensitive resistive material described with reference to FIG. 3 may be patterned on resistive column-row matrix 104 in any suitable way. In one example, resistive column-row matrix 104 may include two sheets that are screen-printed with silver ink, such as a bottom sheet with screen-printed rows and a top sheet with screen-printed columns. Force-sensitive resistive ink may then be painted at the intersections, such that when a touch is applied, the resistive ink at the intersections touches, allowing a circuit to be formed with that row and column (e.g., by closing one of resistive switches 312). The resistance drop at the intersection is proportional to the force applied by the touch, such that increased force yields decreased resistance.

In another example, resistive column-row matrix 104 may include two sheets that may be patterned with carbon ink and separated by a separator layer having holes at the intersections. A resistor, such as a small string of carbon, may provide a contact point at the intersection. A force spreader may additionally be utilized, to direct the applied force to push the top membrane down through the hole to make electrical contact with the bottom sheet (e.g., by closing one of resistive switches 312). Thus, as more force is applied, the membrane deforms more into the hole and the force spreads. This physical spreading increasingly shorts the resistor so the resistance drops between that row and column.

It should be appreciated that resistive input device 102 as described herein is not limited to a computer keyboard. Rather, resistive input device 102 may be any suitable device comprising a resistive column-row matrix 104 with a multiplexed row measurement circuit, such as other types of keyboards, multi-touch sensors, etc.

Further, the above-described methods may also be applied to ordinary keyboard matrices (e.g., matrices which do not have deliberate resistors added). However, given the relatively high-speed and parallel design, the benefit may be much less significant. Further, the above-described methods may also be applied to computing systems with parallel row reading hardware. In this case, the analogous technique is to hierarchically pre-test columns that were completely devoid of depressed switches in the previous scan.

Further, it should be appreciated that in the case of the input device comprising mechanical keys, these keys may suffer from a phenomenon known as bounce. This is when there are a number of make-break cycles before settling down to a consistent contact. Computer keyboards generally provide debouncing logic so that these bounces do not appear as multiple keystrokes when only one was intended. When a key bounces shortly after initial contact, it is fairly likely to strike again soon. Thus, in addition to using key lists from the previous scan, the methods as described herein may further utilize debounce information to include keys which are probably bouncing in the multi-cell group examined in the hierarchical scan.

Further, it should be appreciated that although the above-described approaches involve applying voltages to columns and sensing rows, this is intended to not be limiting in any sense, and the converse may be done. Moreover, the above-described activated and disabled voltages are also not intended to be limiting in any sense. It should be appreciated that the activated and disabled voltages may be relatively defined with respect to a baseline signal. As such, determination of whether a scan voltage corresponds to an activated or disabled voltage may include comparing the scan voltage to the baseline voltage, a portion of the baseline voltage, a predetermined difference from the baseline voltage, or performing any other such suitable determination.

In some embodiments, the above-described methods and processes may be tied to a computing system including one or more computing devices which may be connected to each other via computer networks, such as the Internet. These computing devices typically include a processor and associated volatile and non-volatile memory, as well as a mass storage device such as a hard drive. In particular, the methods and processes described herein may be implemented as a computer application, computer service, computer API, computer library, and/or other computer program product.

FIG. 1 schematically shows a nonlimiting computing device 100 that may perform one or more of the above-described methods and processes. Computing device 100 is shown in simplified form. It is to be understood that virtually any computer architecture may be used without departing from the scope of this disclosure. In different embodiments, computing device 100 may take the form of a mainframe computer, server computer, desktop computer, laptop computer, tablet computer, home entertainment computer, net-work computing device, mobile computing device, mobile communication device, gaming device, etc.

Computing device 100 includes a logic subsystem 106 and a data-holding subsystem 108. Computing device 100 may optionally include a display subsystem, communication subsystem, and/or other components not shown in FIG. 1. Computing device 100 may also optionally include user input devices such as keyboards, mice, game controllers, cameras, microphones, and/or touch screens, for example.

Logic subsystem 106 may include one or more physical devices configured to execute one or more instructions. For example, the logic subsystem may be configured to execute one or more instructions that are part of one or more applications, services, programs, routines, libraries, objects, components, data structures, or other logical constructs, such as instructions to control matrix inputs to resistive column-row matrix 104 of resistive input device 102 and the described scanning operations for discerning one or more input locations on resistive column-row matrix 104. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely-accessible networked computing devices configured in a cloud computing configuration.

Data-holding subsystem 108 may include one or more physical, non-transitory devices configured to hold data and/or instructions executable by the logic subsystem to implement the herein-described methods and processes. For example, data-holding subsystem 108 may include instructions executable by logic subsystem 106, such as instructions to control matrix inputs and the above-described scanning operations. When such methods and processes are implemented, the state of data-holding subsystem 108 may be transformed (e.g., to hold different data).

Data-holding subsystem 108 may include removable media and/or built-in devices. Data-holding subsystem 108 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 108 may include devices with one or more of the following characteristics: volatile, nonvolatile, dynamic, static, read/write, read-only, random access, sequential access, location addressable, file addressable, and content addressable. In some embodiments, logic subsystem 106 and data-holding subsystem 108 may be integrated into one or more common devices, such as an application-specific integrated circuit or a system on a chip.

The terms "module," "program," and "engine" may be used to describe an aspect of computing device 100 that is implemented to perform one or more particular functions. In some cases, such a module, program, or engine may be instantiated via logic subsystem 106 executing instructions held by data-holding subsystem 108. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. Furthermore, the claimed/described embodiments and exemplary methods should not be construed as being limited to those which solve one or more of the problems discussed herein. The specific routines or methods described herein may represent one or more of any number of processing strategies. As such, various acts illustrated may be performed in the sequence illustrated, in other sequences, in parallel, or in some cases omitted Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. In a resistive column-row matrix comprising a plurality of columns and a plurality of rows and configured to provide output in response to touch or other physically-applied inputs, a method of discerning one or more input locations on the resistive column-row matrix, comprising:
   receiving one or more physically-applied inputs at the resistive column-row matrix;
   during application of the one or more physically-applied inputs, performing a hierarchical scan of each of the plurality of rows comprising the resistive column-row matrix, the hierarchical scan of each row determining whether the one or more physically-applied inputs are causing activation of any column-row cell within the row by concurrently applying a scan control signal to all of the plurality of columns and reading a single scan voltage for the row;
   performing a supplemental scan within the row if it is determined that a physically-applied input is causing activation of any column-row cell within the row; and
   generating, based on the hierarchical scan and the supplemental scan, an output indicative of the one or more input locations on the resistive column-row matrix of the one or more physically-applied inputs.

2. The method of claim 1, further comprising determining some but not all of the plurality of rows based on one or more previously-discerned input locations on the resistive column-row matrix.

3. The method of claim 2, wherein the some but not all of the plurality of rows exclude other rows of the plurality of rows comprising the one or more previously-discerned input locations on the resistive column-row matrix.

4. The method of claim 3, further comprising determining via the hierarchical scan that a physically-applied input is not causing activation of a column-row cell within the some but not all of the plurality of rows, and performing a supplemental scan within the other rows comprising one or more previously-discerned input locations on the resistive column-row matrix.

5. The method of claim 1, further comprising, determining, for each row of the plurality of rows, that the one or more physically-applied inputs are causing activation of a column-row cell within the rows if a scan voltage read for that row corresponds to an activated voltage.

6. The method of claim 5, further comprising, determining, for each row of the plurality of rows, that the one or more physically-applied inputs are not causing activation of a column-row cell within the row if the scan voltage read for that row corresponds to a disabled voltage.

7. The method of claim 1, further comprising, determining, for each column-row cell, that the one or more physically-applied inputs are causing activation of the column-row cell if a scan voltage for the column-row cell corresponds to an activated voltage.

8. The method of claim 7, further comprising, determining, for each column-row cell, that the one or more physically-applied inputs are not causing activation of the column-row cell if the scan voltage corresponds to a disabled voltage.

9. The method of claim 8, wherein generating the output comprises, for each column-row cell corresponding to an activated voltage, indicating a location of the column-row cell on the resistive column-row matrix based on a column and a row of the resistive column-row matrix comprising the column-row cell.

10. The method of claim 1, wherein performing the hierarchical scan is further based on one or more of a temporally-previous hierarchical scan and a temporally-previous supplemental scan.

11. The method of claim 10, wherein determining whether the one or more physically-applied inputs are causing activation of a column-row cell within the row comprises determining activation with respect to one or more of the temporally-previous hierarchical scan and the temporally-previous supplemental scan.

12. A data-holding subsystem holding instructions executable by a logic subsystem to:
receive one or more physically-applied inputs at a resistive column-row matrix configured to provide output in response to touch or other physically-applied inputs;
during application of the one or more physically-applied inputs, perform a hierarchical scan of each of a plurality of rows comprising the resistive column-row matrix, the hierarchical scan of each row determining whether the one or more physically-applied inputs are causing activation of any column-row cell within the row by concurrently applying a scan control signal to all of a plurality of columns comprising the resistive column-row matrix and reading a single scan voltage for the row;
perform a supplemental scan within the row if it is determined that a physically-applied input is causing activation of any column-row cell within the row; and
generate, based on the hierarchical scan and the supplemental scan, an output indicative of one or more input locations on the resistive column-row matrix of the one or more physically-applied inputs.

13. The data-holding subsystem of claim 12, wherein the instructions are executable to determine some but not all of the plurality of rows based on one or more previously-discerned input locations on the resistive column-row matrix.

14. A computing device, comprising:
a resistive input device comprising a force-sensitive resistive material and configured to receive touch or other physically-applied inputs, the resistive input device comprising a resistive column-row matrix comprising a plurality of rows and a plurality of columns, each intersection of a row and a column defining a column-row cell;
a logic subsystem; and
a data-holding subsystem holding instructions executable by the logic subsystem to:
receive one or more physically-applied inputs at the resistive column-row matrix;
select a first set of multi-cell groups of a plurality of multi-cell groups comprising the resistive column-row matrix;
during application of the one or more physically-applied inputs, determine if the one or more physically-applied inputs are causing activation of one or more column-row cells within the first set of multi-cell groups;
if it is determined that the one or more physically-applied inputs are causing activation of one or more column-row cells within the first set of multi-cell groups, perform a supplemental scan on the first set of multi-cell groups and in response, generate an output indicative of one or more input locations on the resistive column-row matrix of the one or more physically-applied inputs;
if it is determined that the one or more physically-applied inputs are not causing activation of one or more column-row cells within the first set of multi-cell groups, select a second set of multi-cell groups of the plurality of multi-cell groups comprising the resistive column-row matrix, the second set of multi-cell groups being different than the first set of multi-cell groups, and during application of the one or more physically-applied inputs, determine if the one or more physically-applied inputs are causing activation of one or more column-row cells within the second set of multi-cell groups;
if it is determined that the one or more physically-applied inputs are causing activation of one or more column-row cells within the second set of multi-cell groups, perform a supplemental scan on the second set of multi-cell groups and in response, generate an output indicative of the one or more input locations on the resistive column-row matrix of the one or more physically-applied inputs; and
if it is determined that the one or more physically-applied inputs are not causing activation of one or more column-row cells within the second set of multi-cell groups, select a third set of multi-cell groups of the plurality of multi-cell groups comprising the resistive column-row matrix, the third set of multi-cell groups being different than the first and second sets of multi-cell groups, and during application of the one or more physically-applied inputs, determine if the one or more physically-applied inputs are causing activation of one or more column-row cells within the third set of multi-cell groups.

15. The computing device of claim 14, wherein the instructions are configured to select the first set of multi-cell groups, the second set of multi-cell groups, and the third set of multi-cell groups based on one or more previously-discerned input locations on the resistive column-row matrix.

16. The computing device of claim of claim 15, wherein the instructions are configured to select the first set of multi-cell groups to exclude the one or more previously-discerned input locations on the resistive column-row matrix and to select the second set of multi-cell groups to include the one or more previously-discerned input locations on the resistive column-row matrix.

17. The computing device of claim of claim 16, wherein the instructions are configured to select the first set of multi-cell groups to include a first set of column-row cells of the resistive column-row matrix and to select the second set of multi-cell groups to exclude the first set of column-row cells of the resistive column-row matrix.

18. The computing device of claim 14, wherein the one or more physically-applied inputs change a resistance in a portion of the force-sensitive resistive material, and wherein the instructions are further executable to determine whether the one or more physically-applied inputs are causing activation within one or more of the first set of multi-cell groups, the second set of multi-cell groups, and the third set of multi-cell groups by applying a scan control signal to a portion of the resistive column-row matrix and measuring a scan voltage across a corresponding portion of the resistive column-row matrix, the scan voltage being proportional to the change in the resistance.

* * * * *